Patented Apr. 6, 1948

2,439,343

UNITED STATES PATENT OFFICE 2,439,343

LIQUID COPOLYMER OF BETA MYRCENE AND PARA METHYL STYRENE

Edward L. Kropa, Old Greenwich, Conn., assignor to American Cyanamid Company, New York, N. Y., a corporation of Maine No Drawing. Application July 12, 1947, Serial No. 760,702

2 Claims. (Cl. 260—86)

This invention relates to synthetic materials having properties similar to the natural drying oils.

An object of the invention is to produce synthetic drying oil-like materials from relatively inexpensive hydrocarbons.

Another object of my invention is to prepare synthetic drying oil-like materials suitable for use in coating compositions.

Still another object of my invention is to prepare coating compositions containing a synthetic drying oil material.

A further object of my invention is to produce polymeric materials having a wide field of application such as, for example, modifiers for plastics.

These and other objects are attained by polymerizing at least one acyclic hydrocarbon having the empirical formula $C_{10}H_{16}$ and having a plurality of carbon-to-carbon double bonds.

The following examples in which the proportions are in parts by weight are given by way of illustration and not in limitation.

EXAMPLE 1

Alloocimene is blown with air by bubbling the latter through the alloocimene for approximately 10 hours. During this interval the viscosity of the alloocimene increases. The polymerization by air blowing may be carried out at room temperature or optionally at temperatures as high as 100°–300° C. The time will vary according to the temperature, the amount of oxygen which is brought into contact with the alloocimene and the efficiency of the blowing operation. Generally the time will vary from a few minutes to a few hours, e. g., from about 1 hour to about 12 hours. The time may be decreased if an oxygen-liberating material such as an organic peroxide be present and/or if elevated temperatures be used.

EXAMPLE 2

Alloocimene which has been freshly steam distilled is heated in the presence of about 0.2% of benzoyl peroxide at about 180° C. for around 12 hours. The resulting product is sufficiently bodied for use as a drying oil.

EXAMPLE 3

In the following table composition A is an alkali-refined linseed oil, composition B is blown alloocimene prepared according to Example 1, composition C is a heat-bodied alloocimene prepared according to Example 2, composition D is heat-bodied alloocimene containing about 0.1% cobalt naphthenate drier and composition E is the heat-bodied alloocimene mixed with an equal proportion of alkali-refined linseed oil. The table indicates the condition of films of each of these compositions after air drying for a total of 1 hour, 2 hours, 4 hours, 5 hours, 6 hours, 4 days and 5 days.

Table 1

| | A | B | C | D | E |
|---|---|---|---|---|---|
| 1 Hour | No Change | Frosting along edges | No Change | No Change | No Change. |
| 2 Hours | do | Highly frosted | do | do | Do. |
| 4 Hours | do | Slightly tacky, frosted film. | Tacky and wet | Tacky almost dry | Do. |
| 5 Hours | do | Wrinkled film | do | Dust-free film | Do. |
| 6 Hours | do | Frosting disappearing, becoming liquid and smooth. | do | Non-tacky, dry | Do. |
| 4 Days | Slightly tacky surface | Moderately tacky; smooth surface. | Hard, smooth glossy film. | Hard, smooth glossy film. | Slightly tacky; rough surface. |
| 5 Days | Dry | Dry | Dry | Dry | Dry. |

The term "No change" as used in the above table means that there is no discernible change from an appearance standpoint.

EXAMPLE 4

| | Parts |
|---|---|
| β-Myrcene | 50 |
| Dodecylamine hydrochloride | 25 |
| Water | 25 |
| Hydrogen peroxide (30% aqueous solution) | 1 |

The dodecylamine hydrochloride is prepared in and used as an aqueous solution by neutralizing the amine with hydrochloric acid bringing the pH to approximately 5. The concentration of emulsifying agent is about 10%. The β-myrcene, water and dodecylamine hydrochloride are agitated for a short time to bring about emulsification. The hydrogen peroxide is added to the resulting emulsion. The emulsion is heated with slow agitation and the temperature is maintained at about 60°–80° C. for 6 hours. The resulting polymeric material is precipitated from the emulsion by adding ethanol or dilute aqueous sodium hydroxide solution or a combination of both. The polymeric material thus obtained is very sticky and gelatinous and is soluble in xylene, toluene and soluble to a more limited extent in methyl ethyl ketone. Films of the polymer dissolved in xylene when applied to tin and air-dried show some creeping. Similar solutions to which about 0.1% of a mixture of cobalt and lead naphthenate is added are applied to tin and air-dried. In this case no creeping is observed. Films of the solution containing the lead cobalt and naphthenate drier may be baked at about 60° C. for 1 hour to form a hard, smooth coating. Air-drying also occurs at room temperature.

EXAMPLE 5

Example 4 may be repeated except that the procedure is modified by increasing the time of heating and by adding a relatively large quantity of water, e. g., about 50 parts, after the emulsion has been heated for around 12 hours. The addition of the water to the emulsion renders it somewhat more stable, during the heating which may be continued from 1-12 hours. The polymeric product, thus obtained may be used in the same manner as described in Example 4, it may be mixed with a natural drying oil and utilized in accordance with Example 3, or it may be applied directly from emulsion as a coating composition using aqueous solutions of driers.

EXAMPLE 6

A crude hydrocarbon mixture containing β-myrcene is refluxed for about 5–6 hours in the presence of oxygen or an oxygen-liberating material such as an organic peroxide. The monomeric hydrocarbons other than β-myrcene are removed by distillation leaving as a residue the polymerized β-myrcene which is a viscous, low molecular weight, yellow, oily material. The product is suitable for use alone or mixed with drying oils in the production of varnishes, paints, enamels, etc. Films of polymeric material produced according to this example dry somewhat more slowly than those produced according to Examples 4 or 5.

EXAMPLE 7

Examples 1, 2, 4 or 5 are repeated using a mixture of alloocimene and β-myrcene in place of either substance alone. Polymeric products are obtained which are suitable for use in coating compositions as, for example, in accordance with Example 3. These products are also useful as modifiers for natural and synthetic rubber.

Alloocimene, β-myrcene or other hydrocarbons coming within the scope of this invention may be polymerized with a compound containing the $CH_2=C<$ group. Aromatic compounds containing an unsubstituted vinyl group or an alpha-methyl substituted vinyl group attached to the aromatic nucleus are preferred. Aromatic compounds having attached to the aromatic nucleus unsaturated aliphatic groups other than vinyl but which contain the $CH_2=C<$ group are also useful in the process of the present invention, particularly when the unsaturated aliphatic group contains no more than five carbon atoms. The following example is illustrative of this modification of my invention.

EXAMPLE 8

| | Parts |
|---|---|
| Crude β-myrcene (approx. 80% pure) | 150 |
| Crude p-methyl styrene (80% p-methyl styrene) | 50 |
| Dodecylamine hydrochloride solution | 100 |
| Water | 100 |
| Hydrogen peroxide (30% aqueous solution) | 2 |

These substances emulsify readily upon agitation and the resulting emulsion becomes very thick when it is heated about 6 hours at about 100° C., preferably in a container having a reflux condenser to prevent any loss of the reactants. The emulsion may be coagulated with a dilute aqueous solution of caustic soda, thereby causing a thick oil-like material to separate. This oily material is washed with ethanol to extract unreacted hydrocarbons. Films of the oily material produced according to this example, including a drier such as cobalt naphthenate, air-dry to form hard coatings in a short period of time.

Products which are somewhat more rubbery may be obtained if the polymerization is carried out under milder conditions than those employed in this example, e. g., at a lower temperature. The purity of the materials also influences to some extent the type of product. Thus, materials of a soft rubbery nature may be obtainable with pure reactants which are especially valuable as modifiers for natural and synthetic rubber, for example, those described by the preceding examples.

Other polymerizable materials which may be polymerized along with alloocimene, β-myrcene, etc., are styrene, p-ethyl styrene, p-butyl styrene, p-cyclohexyl styrene, p-dodecyl styrene, p-benzyl styrene, p-phenyl styrene, p-cyanostyrene, p-chlorostyrene, p-bromostyrene, p-nitrostyrene, p-ethoxystyrene, p-acetostyrene, mixtures thereof, vinyl benzene derivatives containing other substituent groups in addition to the para substituent, p-isopropenyl toluene, acrylonitrile, dichloro-acrylonitrile, vinyl acetate, methyl acrylate, methyl methacrylate, methallyl cyanide, methacrylonitrile, allyl esters, etc.

Furthermore, dienes may be polymerized along with a polyene having the empirical formula $C_{10}H_{16}$. Examples of such materials are butadiene, isoprene, pentadiene-1,3 (including the geometric isomers thereof), pentadiene-1,4, 2,3-dimethyl butadiene, the chlorobutadienes, etc. Also, I may use drying oils or fatty acids containing conjugated carbon-to-carbon double bonds. The rapidity with which a material produced according to my invention dries is dependent upon the relative proportion of alloocimene or β-myrcene or the like as compared with other polymerizable materials which may be present. The compositions containing the relatively large proportion of a polyene of the empirical formula $C_{10}H_{16}$ dry faster than those which contain a relatively small proportion of such a polymer. Polymers containing at least about 75% of alloocimene or β-myrcene dry very rapidly while those containing less than 25% dry relatively slowly. My polymeric materials may be dissolved in any suitable solvent for use in coating compositions, such solvents including toluene, xylene, the ketones, ethyl dichloride, etc. To such solutions natural or synthetic drying oils may be added as well as resinous materials, e. g., the phenol-formaldehyde condensation products especially the substituted phenol-formaldehyde condensation products, p-tertiary amyl-phenol-formaldehyde condensation products, aminotriazine-formaldehyde condensation products, polyhydric alcohol-polycarboxylic acid resins desirably modified with a fatty oil acid preferably a drying oil acid, ester gum, coumarone-indene polymers, the natural resinous materials such as batavia gum, gum dammar, East India resin, rosin, gum elemi, etc. These compositions may be mixed with the polymerized $C_{10}H_{16}$ hydrocarbons or the polymerization may be made to occur in the presence of these.

A compatible dye, pigment or lake may be included in my coating compositions, e. g., titanium dioxide, zinc oxide, ferric oxide, malachite green, toluidine red, ochre, carbon black, etc. Furthermore, any desired filler, extender, etc., may be included in the coating compositions.

My polymeric products may be utilized in modifying natural synthetic rubber-like materials. Among the synthetic rubber-like materials which may be modified, the following are illustrative: butadiene-acrylonitrile polymers, butadiene-styrene polymers, pentadiene-1,3-acrylonitrile polymers, etc.

My polymeric materials may be formed by polymerizing any acyclic hydrocarbon having a plurality of carbon-to-carbon double bonds and having the empirical formula $C_{10}H_{16}$. Such materials preferably have the double bonds arranged in a conjugated system. My invention does not include the use of those materials which include an acetylenic linkage. The polymerization may be effected at temperatures ranging from room temperature to 300° C. If the polymerization is caused by the blowing of air, the temperature is preferably from about room temperature to 100° C. If the polymerization is carried out by heat-bodying in the presence of a substance which liberates oxygen, the temperature of the polymerization is preferably about 100°–250° C. The heat-bodying operation may be carried out in the presence or absence of a natural drying oil or other polymerizable material. If a mixture of a drying oil, e. g., linseed oil and alloocimene or β-myrcene be bodied, a temperature of about 200°–300° C. is suitable. If the polymerizable materials be emulsified in water, the reaction may be carried out at temperatures ranging from room temperature to about 100° C. but preferably at from about 60°–80° C. Copolymerization with compounds containing the $CH_2=C<$ group may be carried out at any temperature from about $-70°$ to 220° C.

Suitable substances for liberating oxygen include: benzoyl peroxide, phthalic peroxide, succinic peroxide, benzoyl acetic peroxide, and other acid peroxides, the fatty acid peroxides, e. g., cocoanut oil acid peroxides, stearic peroxide, and oleic peroxide, the alcohol peroxides, e. g., tertiary butyl peroxide and the terpene peroxides, e. g., ascaridole. Some inorganic peroxides may also be employed, e. g., hydrogen peroxide, etc. In some instances it may be desirable to employ the very active polymerization catalysts, e. g., metal halides as aluminum chloride, ferric chloride, stannic chloride, boron trifluoride, etc., acids such as p-toluene sulfonic acid, hydrofluoric acid, fluoroboric acid, orthophosphoric acid, tetraphosphoric acid, sulfuric acid, acetyl sulfuric acid, ethyl sulfuric acid, etc., as well as soluble cobalt and lead salts such as the linoleate and naphthenate. Activated clays such as fuller's earth, diatomaceous earth, alumina, bauxite, etc., may also be employed as polymerization catalysts. The concentration of the catalysts or the oxygen-liberating compounds is usually small, i. e., about 0.1%–2%.

Any desired proportions of $C_{10}H_{16}$ acyclic hydrocarbon and compound containing the $CH_2=C<$ group may be copolymerized in accordance with the present invention. However, I prefer to use from 5%–95% of the total weight of the two reactants of the $C_{10}H_{16}$ acyclic hydrocarbon with a corresponding 95%–5% of the $CH_2=C<$ compound.

Drying oils which may be included in my coating compositions include linseed oil, tung oil, perilla oil, sunflower seed oil, dehydroxylated castor oil, glycerides of the isomerized polyene fatty oils (which do not normally dry), unsaturated fatty oil esters of pentaerythritol or dipentaerythritol, etc.

My polymers are suitable for a wide variety of uses in the fields of plastics and coating compositions. My products may be applied to various surfaces for producing decorative or protective coatings. They are also applicable to paper, textiles, or other fibrous materials either as a coating material or as an impregnating material. My polymeric materials are also useful in the production of surface coverings such as the binding material for linoleum by itself or admixed with natural drying oils.

Compositions prepared according to my invention may be used in adhesives particularly in conjunction with tacky materials such as natural and synthetic rubber.

Obviously many modifications and variations in the processes and compositions described in my invention may be made without departing from the spirit and scope of the invention as defined in the appended claims.

This is a continuation-in-part of my copending applications Serial No. 409,122 filed August 30, 1941, Serial No. 402,954, filed July 18, 1941, now abandoned, and Serial No. 652,799, filed March 7, 1946, now abandoned.

I claim:

1. A liquid copolymer of β-myrcene and p-methyl styrene in a weight ratio of 3:1, β-myrcene to p-methyl styrene.

2. A process of preparing the liquid copolymer of claim 1 which comprises heating for 6 hours at 100° C. an aqueous emulsion including β-myrcene and p-methyl styrene in the presence of hydrogen peroxide as a catalyst to effect copolymerization of said β-myrcene and said p-methyl styrene.

EDWARD L. KROPA.

REFERENCES CITED

The following references are of record in the file of this patent:

UNITED STATES PATENTS

| Number | Name | Date |
| --- | --- | --- |
| 2,349,210 | Traylor | May 16, 1944 |
| 2,383,084 | Rummelsburg | Aug. 21, 1945 |